Jan. 2, 1945.  H. WARP  2,366,224
LIGHT DEFLECTOR SCREEN AND METHOD OF MAKING THE SAME
Filed June 28, 1941  2 Sheets-Sheet 1
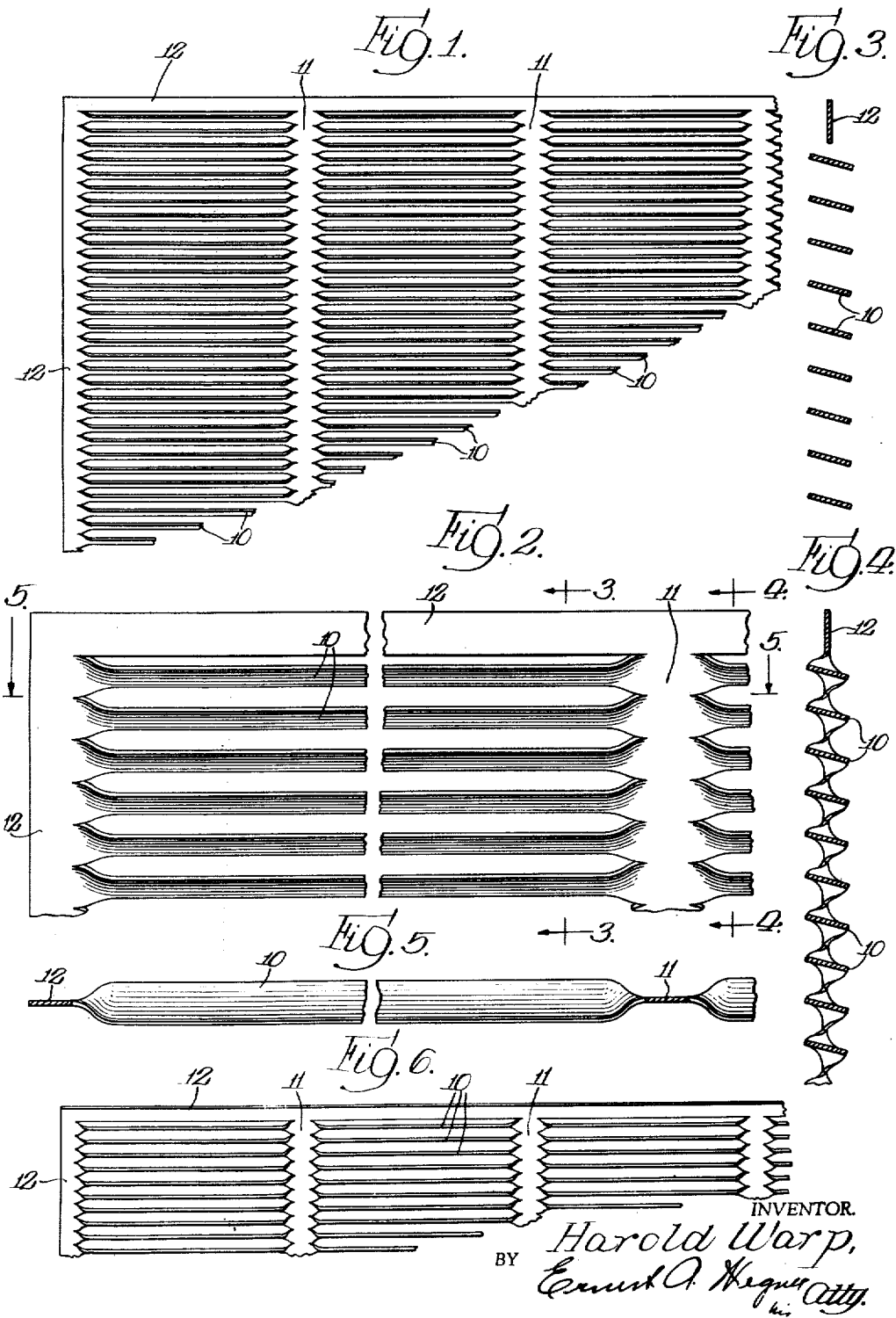
INVENTOR.
Harold Warp,
BY Ernest A. Hegney Atty.

Jan. 2, 1945. H. WARP 2,366,224
LIGHT DEFLECTOR SCREEN AND METHOD OF MAKING THE SAME
Filed June 28, 1941 2 Sheets-Sheet 2
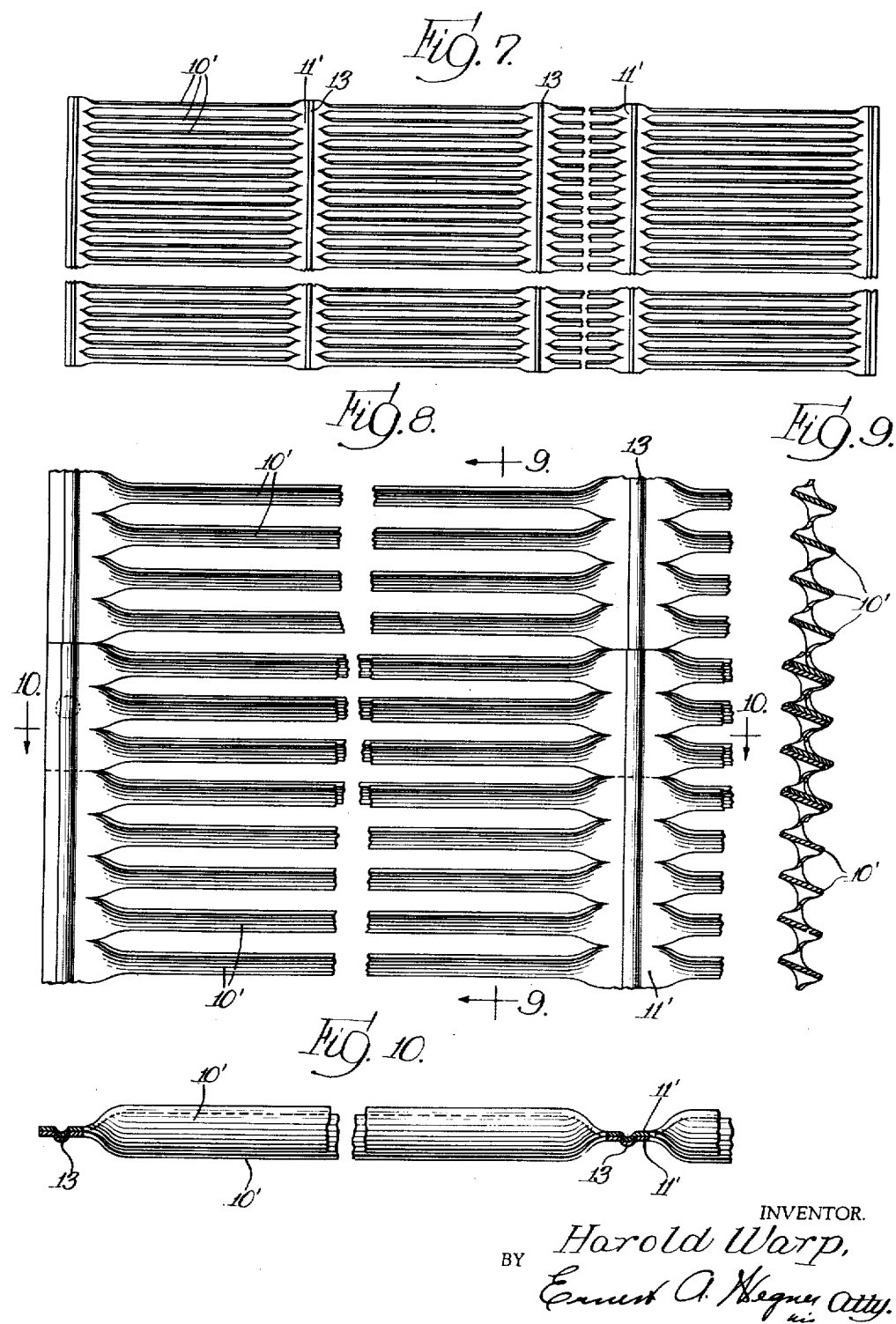
INVENTOR.
Harold Warp, Patented Jan. 2, 1945

2,366,224

UNITED STATES PATENT OFFICE 2,366,224

LIGHT DEFLECTOR SCREEN AND METHOD OF MAKING THE SAME

Harold Warp, Chicago, Ill.

Application June 28, 1941, Serial No. 400,213

10 Claims. (Cl. 98—121)

The invention relates generally to screens and more particularly to screens which also serve as light ray deflectors.

A general object of the invention is to provide a screen of the character described which is of new and improved construction.

A more particular object is to provide a screen capable of deflecting light rays which is of sturdy, unitary and integral construction readily and economically manufactured.

Another object is to provide a screen that may be manufactured with a solid, smooth-edged border so that the screen may be secured to a frame without necessity of employing the usual molding.

Another object is to provide a screen capable of deflecting light rays that may be readily secured together to cover areas larger in dimension than the maximum dimension of screens as commonly manufactured.

A further object is to provide a new and improved method of manufacturing light ray deflecting screens.

Yet a further object is to provide a method of manufacturing light ray deflecting screens employing solid sheets of metal as the basic material and including the steps of die-cutting the sheet into narrow strips secured at their ends and twisting the strips so cut at an angle to the plane of the sheet.

Other objects and advantages will become apparent from the following detailed description taken in connection with the accompanying drawings, in which:

Fig. 1 is a side elevational view of a portion of a screen embodying the features of this invention.

Fig. 2 is an enlarged view of a small portion of the screen shown in Fig. 1 better to show the construction thereof.

Fig. 3 is a sectional view taken along the line 3—3 of Fig. 2.

Fig. 4 is a sectional view taken along the line 4—4 of Fig. 2.

Fig. 5 is a sectional view taken along the line 5—5 of Fig. 2.

Fig. 6 is a view taken from the front of Fig. 1, with the line of vision parallel with the plane of the elements.

Fig. 7 is a side elevational view similar to Fig. 1 of a portion of a screen embodying the invention, but somewhat modified in that there is no border at the top and bottom edges.

Fig. 8 is an enlarged side elevational view showing two screens interlocked.

Fig. 9 is a sectional view taken along the line 9—9 of Fig. 8.

Fig. 10 is a sectional view taken along the line 10—10 of Fig. 8.

While the invention is susceptible of various modifications and alternative constructions, it is shown in the drawings and will hereinafter be described in detail in what is preferably referred to as alternative forms, the alternative referring as much to the method as the resulting product. It is not intended, however, that the invention is to be limited to the specific disclosures made, but it is intended to cover all modifications and alternative constructions falling within the spirit and scope of the invention as defined in the appended claims.

The invention contemplates the provision of a unique screen which comprises generally a plurality of narrow parallel elements 10 disposed at an angle with the plane of the screen so as to permit passage through the screen of air and light, while deflecting certain direct light rays. To the end that the screen may be readily and economically manufactured yet be of sturdy construction, it is formed as a unitary structure with the elements 10 die-cut and drawn from a solid sheet of metal. As best seen in Figs. 1 and 2, the sheet of metal is first cut along parallel, uniformly spaced lines of equal length to form columns of the narrow elements 10 severed along their side edges, but retained integral at their ends with dividing and reinforcing or supporting strips 11. As best seen in Figs. 3, 4 and 5, each element 10 is then twisted about its longitudinal center line out of the plane of the metal sheet to become disposed at an angle with the plane of the sheet. Herein the elements are shown making an angle of 75° with the plane of the sheet, though it is to be understood that this is an arbitrary angle which might be varied to suit the particular conditions for which the screen is to be employed without departing from the spirit of the invention. Save for short distances at each end (see Figs. 2, 4 and 5), the elements 10 themselves are not bent or distorted but remain as straight and plane elements, as best seen in Fig. 3.

The particular metal composing the sheet from which the screen is made may, of course, vary. It is desirable, however, that the sheet be very thin, preferably on the order of five one-thousandths of an inch and, though this thickness may vary, preferably it should not exceed ten one-thousandths of an inch. The metal also should have a certain degree of resiliency so that it will tend to assume its normal position if not too severely or sharply bent yet must be capable of withstanding the slight drawing operation which takes place at the ends of the strips when they are twisted out of the plane of the sheet. Inasmuch as the screen finds a major use as an actual window screen, it is also preferable that the metal have a dull, roughened or painted surface so that the screen will not serve merely to reflect the undiffused light rays into a room.

As just stated, the screen will find its major employment as a window screen. To that end, the screen may within certain physical limits be formed with almost any mesh desired ranging from twenty to eight, or even less per inch. A preferred number is sixteen elements per inch, as best seen in Fig. 1, which illustrates the screen at just twice normal size. The number of elements per inch will, of course, determine the width of each element, as well as the spacing of the elements when they are twisted to the positions shown in Figs. 2 to 5. Thus with sixteen elements to the inch, each element will be one-sixteenth of an inch wide and the spacing between the elements will be one-sixteenth of an inch, while for eight elements per inch each element will have a width of one-eighth of an inch and a spacing of one-eighth of an inch, and so forth for any mesh that may be selected. The reinforcing or dividing strips 11 are herein shown as spaced one inch apart. This has been found to be a desirable spacing, giving the necessary support and rigidity to the elements, though, of course, this spacing might be varied without departing from the spirit of the invention. As shown in the construction illustrated in Fig. 1, these strips are each one-sixteenth of an inch in width.

In the manufacture of the screen, a single die forming a single element 10 might be employed, or a plurality of such dies might be formed as a unit, or even groups of such units of dies arranged in proper spaced relation might be employed. Preferably, of course, a reasonable number of dies are employed in order to expedite the production of the screen. With this manner of forming the screen, any width or length of screen may be manufactured, depending only upon the dimensions of the sheet of metal employed, and, if a continuous strip of metal is obtainable, the screen may be formed as a continuous operation simply by employing dies or groups of dies arranged side by side so as to cover the entire width of the sheet of metal, with the sheet of metal then fed to the dies in a step by step operation.

As above stated, the screen will find major employment as a conventional window screen, and for this use it is particularly well adapted. The screen, in addition to serving the usual function of preventing the entry of insects and the like, because of the inclined elements 10, also serves the function of a Venetian blind. The screen, however, is advantageous over a Venetian blind because it will be disposed exteriorly of an opening rather than interiorly. As a result the sun's rays are arrested outwardly of the building before they have had an opportunity to enter and heat the building. Furthermore, the sun's rays are arrested where the heat generated by the rays is dissipated into the atmosphere instead of into the building. The screen has still another advantage over a Venetian blind. Because the elements 10 are so very narrow more light is admitted than where the elements are from thirty-two to forty times wider, as in conventional Venetian blinds.

When employed for a window, the screen will, of course, be so applied that the elements 10 slope downwardly and outwardly. Because of the extreme thinness of the elements 10 (five one-thousandths of an inch) and because the normal vision from a window is slightly downwardly from the horizontal, the screen gives a substantially unobstructed view. This is best seen from Fig. 6 which is a view taken in the direction of the normal line of vision from the interior of a window to which the screen is applied. With the eyes focused on a distant object, one is substantially unaware of the elements 10 and notices only the narrow one-sixteenth inch strips. When viewing Fig. 6, it should be remembered that the elements, are actually very much thinner than shown.

The screen is also particularly well adapted for attachment to metal screen frames. Such metal frames conventionally are formed with a groove into which the screen is forced and held by a strip inserted into the groove. The present screen is readily attached to such a frame because the elements 10, to be forced into the groove, when contacted by the strip would again straighten out and lie flat.

On the other hand, each sheet of metal from which the screen is formed may first be cut to some standard size conforming to the windows or to the openings with which the screen is to be employed. The screen may then be formed with a continuous, uniform and smooth-edged border 12 circumscribing the entire screen. Such a screen has the advantages that it may be secured to a wooden frame or directly to the casing defining an opening without necessity of employing the usual molding required for conventional screens. The border provides strips through which nails or other securing means may be driven and at the same time provides a smooth edge which need not be covered up to avoid catching on clothing or the like, and also provides a continuous edge greatly preserving the life of the screen over that of a screen having a ragged edge.

In Figs. 7 to 10, there is disclosed an alternative form of screen, differing primarily only in the manner in which the sheets of metal from which the screen is formed are supplied to the dies. The screen, like that shown in Figs. 1 to 5, is divided by supporting or reinforcing strips 11' into columns of elements 10' twisted out of the plane of the sheet making up the screen. The spacing and proportions of the parts are the same as disclosed in Figs. 1 to 5, or may without departing from the invention be varied within certain limits, as stated in connection with the description of the first form of screen. Should it develop that no suitable sheet of metal is obtainable that is wide enough to equal or exceed the width of an opening to be screened, the screen as herein constructed readily adapts itself for joining so that screens of any desired width or length are readily obtainable. To that end, the sheet of metal instead of being fed to the dies as described in connection with Figs. 1 to 5, that is, so that the reinforcing and dividing strips will run longitudinally of the sheet, is fed to the dies so that the strips 11' run transversely of the sheet. When formed in this manner, no top and bottom border is left but elements 10' are formed up to the very edges of the sheet, as best seen in Fig. 6. Without a top and bottom border to interfere, completed screens may be jointed, as shown in Figs. 7, 8 and 9. As clearly seen in those figures, particularly Fig. 8, two sections of screens to be jointed are overlapped with the elements 10' partially telescoped and resting in face to face contact with one another. When so overlapped, the reinforcing strips 11' will also be extending parallel and in contact with one another and the screen sections may thus be secured together by spot-welding the strips 11' together. Such spot-welding is indicated at 13 in Fig. 7. It has been found sufficient if every third or even fourth strip is spot-welded. With the length of the metal strip now determining the width of the screen, it is, of course, readily possible to obtain a screen of sufficient width to cover any opening, and since the length of the screen may now be made indefinite simply by the joining of additional sections of screen, any opening is readily covered. The joining of the screen sections will reinforce the resulting screen in a horizontal or transverse direction. The screen may also be reinforced and stiffened in a vertical or longitudinal direction by forming the strips 11' with a bead 13.

It is believed apparent from the foregoing that I have perfected a unique screen which is readily and economically manufactured and which is unusually sturdy because of the unitary construction and the total elimination of any joints which might become loosened. This screen, moreover, when made of certain mesh, preferably sixteen to the inch, will be just as effective in keeping out insects as present day woven screens and at the same time will act as Venetian blinds preventing the direct rays of the sun from entering the opening. The screen, moreover, will arrest the rays at the proper and desirable point, namely, outwardly of the opening, so as to keep a room or building equipped with the screens much cooler than by the use of ordinary Venetian blinds. When made so as to have a continuous and smooth-edged border, the screen is readily applied to metal frames or even to wooden frames, or directly to wooden casings defining the opening, without the necessity of the conventional molding normally employed. Even when made without the border the screen is readily applied to a metal frame, since the elements 10, though normally disposed at an angle to the frame, will readily yield and lie flat against the frame. When the screen is made in the manner described in connection with Figs. 7 to 10, the sections of the screen are readily joined to form a screen of such width and length as to cover any opening of normal or even abnormal area. Moreover, when made in this latter manner, dealers need stock only a few standard widths which can, by joining, be employed to cover substantially any size opening without material waste.

I claim as my invention:

1. A screen for windows or other light admitting openings formed from a solid sheet of very thin metal having a plurality of parallel, continuous and equally spaced supporting strips dividing the screen into narrow columns approximately one inch in width and each of the columns being composed only of a plurality of uniform and parallel elements formed from the sheet of metal and extending transversely of the column, said elements being severed along their side edges but integral at their ends with said supporting strips and twisted to be disposed at an angle to the plane of the screen, said elements being so narrow and numerous as to prevent the passage of insects through the screen.

2. An insect barring screen for windows or other light admitting openings formed from a solid sheet of thin metal having a plurality of parallel, continuous, equally and closely spaced supporting strips dividing the screen into columns and each of the columns being composed only of a plurality of uniform, narrow and parallel elements formed from the sheet of metal, said elements being approximately one-sixteenth of an inch in width and severed along their side edges but integral at their ends with said supporting strips and twisted throughout their width to be disposed at an angle to the plane of the screen and spaced when so twisted a distance equal to their width.

3. A joined screen comprising a pair of screen sections each formed from a solid sheet of metal and composed of a plurality of parallel, continuous, equally and closely spaced supporting strips remaining in the plane of the screen and dividing the screen into columns, each column being composed of a plurality of parallel elements uniform as to width and spacing, integral at their ends with the strips and each twisted out of the plane of the sheet about its longitudinal center line, the ends of the screen section parallel with the elements being overlapped with at least one element of one section face to face with an element of the other section and with the supporting strips in contact, and means for securing the sections together.

4. The method of making a screen comprising the steps of providing at least two solid sheets of metal, slitting each sheet of metal along parallel lines of equal length to form narrow elements integral with the sheet at their ends, and twisting the elements so formed out of the plane of the sheet of metal about their longitudinal center line, overlapping the ends of the sheets of metal parallel with the elements at least to the extent of causing one element of one sheet and the portion of the sheet removing in the plane of the sheet to lie face to face respectively with an element and a plane portion of the other sheet, and welding the overlapping portions of the sheets together.

5. The method of making a screen comprising the steps of providing at least two solid sheets of metal, slitting each sheet of metal with rows of parallel lines of equal length to form columns of narrow elements divided by continuous strips in the plane of the sheet with which the ends of the elements are integral, and twisting each element so formed about its longitudinal center line out of the plane of the sheet of metal, overlapping the ends of the sheets of metal parallel with the elements at least to the extent of causing one element of one sheet and the continuous strips to lie face to face respectively with an element and the overlapped portions of the strips of the other sheet, and welding certain of the continuous strips together.

6. An insect barring screen for windows or other light admitting openings formed from a solid sheet of very thin metal having a plurality of parallel, continuous and equally spaced supporting strips dividing the screen into columns approximately one inch in width, each of the columns being composed only of a plurality of uniform, narrow and parallel elements formed from the sheet of metal, said elements being approximately one-sixteenth of an inch in width and severed along their side edges but integral at their ends with said supporting strips, and twisted to be disposed at such angle to the plane of the screen when the screen is disposed in a vertical plane with the columns upright as to prevent the direct rays of the mid day sun from passing therethrough.

7. An insect barring screen for windows or other light admitting openings formed from a solid sheet of very thin metal having a plurality of parallel, continuous and equally spaced supporting strips each approximately one-sixteenth of an inch in width dividing the screen into columns with each column approximately one inch in width, each of the columns being composed only of a plurality of uniform, narrow and parallel elements formed from the sheet of metal, said elements being approximately one-sixteenth of an inch in width and severed along their side edges but integral at their ends with said supporting strips, and twisted to be disposed at such angle to the plane of the screen when the screen is disposed in a vertical plane with the columns upright as to prevent the direct rays of the mid day sun from passing therethrough.

8. An insect barring screen for windows or other light admitting openings formed from a solid sheet of metal from five-one-thousandths to ten-one-thousandths of an inch thick having a plurality of parallel, continuous and equally spaced supporting strips approximately one-sixteenth of an inch in width dividing the screen into columns approximately one inch in width, each of the columns in turn being composed only of a plurality of uniform, narrow and parallel elements formed from the sheet of metal, said elements being approximately one-sixteenth of an inch in width and severed along their side edges but integral at their ends with said supporting strips, and twisted to be disposed at such angle to the plane of the screen when the screen is disposed in a vertical plane with the columns upright as to prevent the direct rays of the mid day sun from passing therethrough.

9. The method of making a screen including the steps of providing a solid elongated sheet of thin metal, forming the sheet of metal with rows of parallel slits approximately an inch in length spaced apart laterally about one-sixteenth of an inch and spaced apart longitudinally about one-sixteenth of an inch to form columns of narrow elements divided by continuous strips with which the ends of the elements are integral throughout the width thereof, and twisting each element so formed throughout its entire width about its longitudinal center line out of the plane of the sheet of metal to form an angle with the sheet lying between 45° and 90°.

10. An insect barring screen for windows or other light admitting openings formed from a solid sheet of thin metal having a plurality of parallel, continuous, equally and closely spaced supporting strips dividing the screen into columns and each of the columns being composed only of a plurality of uniform, narrow and parallel elements formed from the sheet of metal, said elements being within the range of one-sixteenth to one-twentieth of an inch in width and severed along their side edges but integral at their ends with said supporting strips and twisted throughout their width to be disposed at an angle to the plane of the screen and spaced when so twisted a distance equal to their width.

HAROLD WARP.

Certificate of Correction

Patent No. 2,366,224.

January 2, 1945.

HAROLD WARP

It is hereby certified that error appears in the printed specification of the above numbered patent requiring correction as follows: Page 3, second column, line 38, for the word "removing" read *remaining*; and that the said Letters Patent should be read with this correction therein that the same may conform to the record of the case in the Patent Office.

Signed and sealed this 27th day of July, A. D. 1948.

[SEAL]

THOMAS F. MURPHY,
*Assistant Commissioner of Patents.*

7. An insect barring screen for windows or other light admitting openings formed from a solid sheet of very thin metal having a plurality of parallel, continuous and equally spaced supporting strips each approximately one-sixteenth of an inch in width dividing the screen into columns with each column approximately one inch in width, each of the columns being composed only of a plurality of uniform, narrow and parallel elements formed from the sheet of metal, said elements being approximately one-sixteenth of an inch in width and severed along their side edges but integral at their ends with said supporting strips, and twisted to be disposed at such angle to the plane of the screen when the screen is disposed in a vertical plane with the columns upright as to prevent the direct rays of the mid day sun from passing therethrough.

8. An insect barring screen for windows or other light admitting openings formed from a solid sheet of metal from five-one-thousandths to ten-one-thousandths of an inch thick having a plurality of parallel, continuous and equally spaced supporting strips approximately one-sixteenth of an inch in width dividing the screen into columns approximately one inch in width, each of the columns in turn being composed only of a plurality of uniform, narrow and parallel elements formed from the sheet of metal, said elements being approximately one-sixteenth of an inch in width and severed along their side edges but integral at their ends with said supporting strips, and twisted to be disposed at such angle to the plane of the screen when the screen is disposed in a vertical plane with the columns upright as to prevent the direct rays of the mid day sun from passing therethrough.

9. The method of making a screen including the steps of providing a solid elongated sheet of thin metal, forming the sheet of metal with rows of parallel slits approximately an inch in length spaced apart laterally about one-sixteenth of an inch and spaced apart longitudinally about one-sixteenth of an inch to form columns of narrow elements divided by continuous strips with which the ends of the elements are integral throughout the width thereof, and twisting each element so formed throughout its entire width about its longitudinal center line out of the plane of the sheet of metal to form an angle with the sheet lying between 45° and 90°.

10. An insect barring screen for windows or other light admitting openings formed from a solid sheet of thin metal having a plurality of parallel, continuous, equally and closely spaced supporting strips dividing the screen into columns and each of the columns being composed only of a plurality of uniform, narrow and parallel elements formed from the sheet of metal, said elements being within the range of one-sixteenth to one-twentieth of an inch in width and severed along their side edges but integral at their ends with said supporting strips and twisted throughout their width to be disposed at an angle to the plane of the screen and spaced when so twisted a distance equal to their width.

HAROLD WARP.

Certificate of Correction

Patent No. 2,366,224.

January 2, 1945.

HAROLD WARP

It is hereby certified that error appears in the printed specification of the above numbered patent requiring correction as follows: Page 3, second column, line 38, for the word "removing" read *remaining*; and that the said Letters Patent should be read with this correction therein that the same may conform to the record of the case in the Patent Office.

Signed and sealed this 27th day of July, A. D. 1948.

[SEAL]

THOMAS F. MURPHY,
*Assistant Commissioner of Patents.*